US007024557B1

United States Patent
Moles et al.

(10) Patent No.: US 7,024,557 B1
(45) Date of Patent: Apr. 4, 2006

(54) SYSTEM AND METHOD FOR SECURE PROVISIONING OF A MOBILE STATION FROM A PROVISIONING SERVER USING ENCRYPTION

(75) Inventors: Bryan J. Moles, Dallas, TX (US); Sudhindra P. Herle, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/475,766

(22) Filed: Dec. 30, 1999

(51) Int. Cl.
*H04L 9/12* (2006.01)
(52) U.S. Cl. ...................................... 713/170; 455/419
(58) Field of Classification Search ................ 380/249; 455/419
See application file for complete search history.

(56) References Cited

U.S. PATENT DOCUMENTS

| | | | | |
|---|---|---|---|---|
| 5,592,470 A | * | 1/1997 | Rudrapatna et al. | 370/320 |
| 5,875,394 A | * | 2/1999 | Daly et al. | 455/411 |
| 6,032,043 A | * | 2/2000 | Houde | 455/433 |
| 6,061,346 A | * | 5/2000 | Nordman | 370/352 |
| 6,061,791 A | * | 5/2000 | Moreau | 713/171 |
| 6,141,544 A | * | 10/2000 | Corriveau et al. | 455/411 |
| 6,275,693 B1 | * | 8/2001 | Lin et al. | 455/414.3 |
| 6,393,270 B1 | * | 5/2002 | Austin et al. | 455/411 |
| 6,408,175 B1 | * | 6/2002 | Park | 455/411 |
| 6,453,162 B1 | * | 9/2002 | Gentry | 455/433 |
| 6,496,505 B1 | * | 12/2002 | La Porta et al. | 370/392 |
| 6,587,684 B1 | * | 7/2003 | Hsu et al. | 455/419 |
| 6,591,306 B1 | * | 7/2003 | Redlich | 709/245 |
| 6,647,260 B1 | * | 11/2003 | Dusse et al. | 455/419 |
| 6,651,105 B1 | * | 11/2003 | Bhagwat et al. | 709/239 |

* cited by examiner

*Primary Examiner*—Gregory Morse
*Assistant Examiner*—Andrew Nalven

(57) ABSTRACT

There is disclosed a security device for use in a wireless network comprising a plurality of base stations that communicate with a plurality of mobile stations. The security device prevents unprovisioned mobile stations from accessing an Internet protocol (IP) data network through the wireless network. The security device comprises a first controller for receiving from the unprovisioned mobile station an IP data packet comprising an IP packet header and an IP packet payload and encrypting at least a portion of the IP payload. The security device also comprises a second controller for determining that the unprovisioned mobile station is, in fact, unprovisioned. In one embodiment, the first controller comprises a data processor that executes an encryption program stored in a memory associated with the data processor.

20 Claims, 5 Drawing Sheets

SYSTEM AND METHOD FOR SECURE PROVISIONING OF A MOBILE STATION FROM A PROVISIONING SERVER USING ENCRYPTION

CROSS-REFERENCE TO RELATED APPLICATIONS

The present invention is related to those disclosed in the following U.S. patent application Ser. No. 09/475,602, filed concurrently herewith, entitled "SYSTEM AND METHOD FOR SECURE PROVISIONING OF A MOBILE STATION FROM A PROVISIONING SERVER USING IP ADDRESS TRANSLATION AT THE BTS/BSC." The foregoing application is commonly assigned to the assignee of the present invention and application. The disclosure of this related patent application is hereby incorporated by reference for all purposes as if fully set forth herein.

TECHNICAL FIELD OF THE INVENTION

The present invention is directed, in general, to wireless networks and, more specifically, to a system for performing secure over-the-air (OTA) service provisioning of cellular phone handsets and other mobile devices.

BACKGROUND OF THE INVENTION

Reliable predictions indicate that there will be over 300 million cellular telephone customers worldwide by the year 2000. Within the United States, cellular service is offered by cellular service providers, by the regional Bell companies, and by the national long distance operators. The enhanced competition has driven the price of cellular service down to the point where it is affordable to a large segment of the population.

The current generation of cellular phones is used primarily for voice conversations between a subscriber handset (or mobile station) and another party through the wireless network. A smaller number of mobile stations are data devices, such as personal computers (PCs) equipped with cellular/wireless modems. Because the bandwidth for a current generation mobile station is typically limited to a few tens of kilobits per second (Kbps), the applications for the current generation of mobile stations are relatively limited. However, this is expected to change in the next (or third) generation of cellular/wireless technology, sometimes referred to as "3G" wireless/cellular, where a much greater bandwidth will be available to each mobile station (i.e., 125 Kbps or greater). The higher data rates will make Internet applications for mobile stations much more common. For instance, a 3G cell phone (or a PC with a 3G cellular modem) may be used to browse web sites on the Internet, to transmit and receive graphics, to execute streaming audio and/or video applications, and the like. In sum, a much higher percentage of the wireless traffic handled by 3G cellular systems will be Internet protocol (IP) traffic and a lesser percentage will be traditional voice traffic.

In order to make wireless services as convenient and as affordable as possible, wireless service providers frequently sell cellular handsets (or other types of mobile stations) directly to potential subscribers from display booths in supermarkets and department stores. Simple instructions are provided to guide the buyer through the process of activating the cellular handset and signing up for wireless services to become a subscriber. In conventional cellular systems, the handset buyer activates the new handset and signs up for service by dialing "*228xx" on the handset keypad in accordance with the handset instructions. The value of "xx" varies according to the identity of the wireless service provider that sells the handset.

Although initially unprovisioned, the new handset must, of necessity, have certain minimum radio frequency (RF) communication capabilities that enable the handset to become provisioned. Dialing "*228xx" on the handset keypad automatically initiates a special purpose call that connects the handset buyer to an operator. The operator requests certain account information from the buyer, such as personal information, a credit card number, home billing address, and the like. When the account information is collected and the account is set up, the operator instructs the handset buyer to enter several sequences of passwords, code numbers, menu-selected commands, and the like, that enable certain functions in the handset.

This process is frequently referred to as "service provisioning." Service provisioning may activate in the cellular handset a Number Assignment Module (NAM), which gives the handset a unique phone number for incoming calls and provides a roaming capability by identifying approved wireless carriers. Service provisioning may also activate in the handset a Preferred Roaming List (PRL), which is a list of frequencies/bands owned by each carrier in each geographical region and which may identify preferred and/or prohibited frequencies in each region as well. Service provisioning also activates an authentication code, sometimes referred to as an "A-key," in the cellular handset. The handset uses the A-key to authenticate the handset when the subscriber attempts to access the wireless network.

The wireless network uses a home location register (HLR) to store the A-key, the phone number, the roaming capability information, and other data related to each handset that has been or is being authenticated and provisioned by the wireless network. The HLR is a permanent database used by the wireless service provider to identify/verify a subscriber and store individual subscriber data related to features and services. The subscriber's wireless service provider uses the HLR data when the subscriber is accessing the wireless network in the subscriber's home coverage area. Other wireless service providers also use the HLR data (typically accessed via wireline telephone networks) when the subscriber roams outside the subscriber's home coverage area.

The conventional provisioning process described above has numerous drawbacks. A human operator must talk the user through the process of pressing keys and verifying screen results. This is time consuming and frequently results in errors, particularly with unsophisticated subscribers. Mistakes may go unnoticed initially and the subscriber may become frustrated that the cellular service does not operate as advertised. When the mistake is finally diagnosed, the provisioning process may need to be at least partially re-performed. The human operator also adds labor costs to the provisioning process.

It would be preferable to automate cellular service provisioning to the greatest extent possible in order to reduce labor costs, eliminate errors, and make the process more user-friendly by minimizing or eliminating subscriber interaction. In particular, it would be far more convenient to perform over-the-air (OTA) cellular service provisioning by accessing a provisioning server from an unprovisioned handset via an Internet connection. In such a scenario, the handset does not place a voice call to an operator, but rather places a "data call" that transmits Internet protocol (IP) packets to, and receives IP packets from, a base station of the wireless network. The 3G systems will make OTA service provisioning of handsets easier and more common.

However, OTA service provisioning of a handset presents serious security problems for the wireless service provider, particularly with respect to fraud. The base station that handles the initial set-up data call from an unprovisioned handset may not store the required provisioning data. Instead, base stations typically access provisioning data from provisioning servers that are in the wireless service provider's network and which may or may not be accessible by an intranet or by the Internet. Many wireless service providers operate clusters of base stations that are not directly connected to each other, but rather are connected to the local Bell telephone companies and/or to the major long-distance carriers. Without an Internet connection, each cluster of base stations would require its own provisioning server. Alternatively, a wireless carrier would have to pay the local Bell companies and/or a long distance company additional line fees to connect the base stations to the provisioning server.

Using an Internet connection allows a wireless service provider to consolidate all service provisioning applications and data in a central repository, rather than maintaining at great 11D expense redundant copies of such information among a large number of provisioning servers. However, it is foreseeable that a sophisticated user could use an unprovisioned handset (possibly with some minor modifications) to access a wireless network under the guise of service provisioning and then use the wireless network to access any IP address on the Internet, not just the IP address of the provisioning server. In effect, the user could defraud the wireless service provider by using the unprovisioned handset to surf the Internet for free.

This problem exists for several reasons. First, IP addresses of other services are freely known to the public. Second, conventional wireless networks do not provide a method or an apparatus capable of blocking access to unauthorized IP addresses that is triggered by the network's knowledge that the mobile is unprovisioned. Third, even if the network provides the mobile with an IP address to be used for provisioning, the mobile must be trusted to use that IP address only.

Therefore, there is a need in the art for improved systems and methods for performing automatic service provisioning of wireless handsets (and other types of mobile stations). In particular, there is a need in the art for systems and methods for performing secure over-the-air provisioning of wireless devices. More particularly, there is a need for systems and methods that are capable of preventing unauthorized persons from using an unprovisioned handset or other type of mobile station to browse the Internet.

SUMMARY OF THE INVENTION

To address the above-discussed deficiencies of the prior art, it is a primary object of the present invention to provide a security device for use in a wireless network comprising a plurality of base stations, wherein each of the base stations is capable of communicating with a plurality of mobile stations. The security device is capable of preventing an unprovisioned one of the plurality of mobile stations from accessing an Internet protocol (IP) data network through the wireless network. In an advantageous embodiment of the present invention, the security device comprises a first controller capable of receiving from the unprovisioned mobile station an IP data packet comprising an IP packet header and an IP packet payload and encrypting at least a portion of the IP payload.

According to one embodiment of the present invention, the first controller is disposed in at least one of the plurality of base stations.

According to another embodiment of the present invention, the first controller is disposed in a mobile switching center of the wireless network. In other embodiments of the present invention, the first controller may be disposed in an interworking function unit of the wireless network, or may be partitioned between the mobile switching center and the interworking function unit.

According to still another embodiment of the present invention, the security device further comprises a second controller capable of determining that the unprovisioned mobile station is unprovisioned.

According to yet another embodiment of the present invention, the second controller determines that the unprovisioned mobile station is unprovisioned if the unprovisioned mobile station is unable to authenticate to the wireless network.

According to a further embodiment of the present invention, the second controller determines that the unprovisioned mobile station is unprovisioned according to one of a predetermined telephone number, a predetermined IP address, or another unique identifier associated with the service provisioning process and selected by the unprovisioned mobile station.

According to a still further embodiment of the present invention, the second controller determines that the unprovisioned mobile station is unprovisioned according to data retrieved from a home location register associated with the wireless network.

According to a yet further embodiment of the present invention, the first controller comprises a data processor capable of executing an encryption program stored in a memory associated with the data processor.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
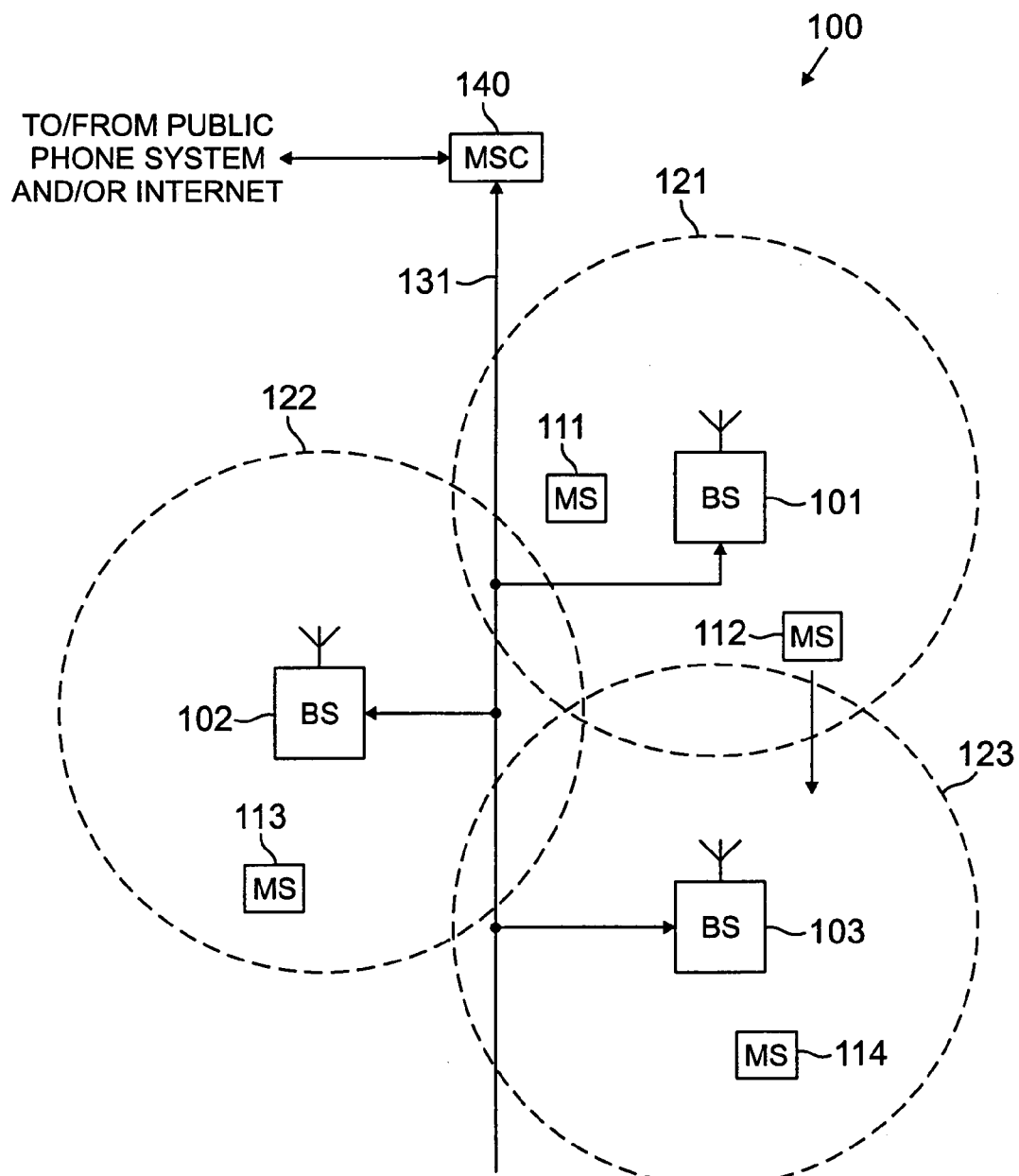
FIG. 1 illustrates a general overview of an exemplary wireless network according to one embodiment of the present invention.

FIG. 1 illustrates a general overview of an exemplary wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable wireless communication devices, including conventional cellular telephones, PCS handset devices, portable computers, telemetry devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

One or more of mobile stations 111–114 may initially be unprovisioned devices. That is, necessary configuration data, such as Number Assignment Module (NAM) data, Preferred Roaming List (PRL) data, or authentication code (or "A-key") data may not be present in, for example, MS 112 or, if present, may not be properly configured or enabled, so that MS 112 is unable to communicate with BS 101. To enable such unprovisioned devices to operate in wireless network 100, an over-the-air (OTA) service provisioning capability is provided in wireless network 100.

Figure 2:
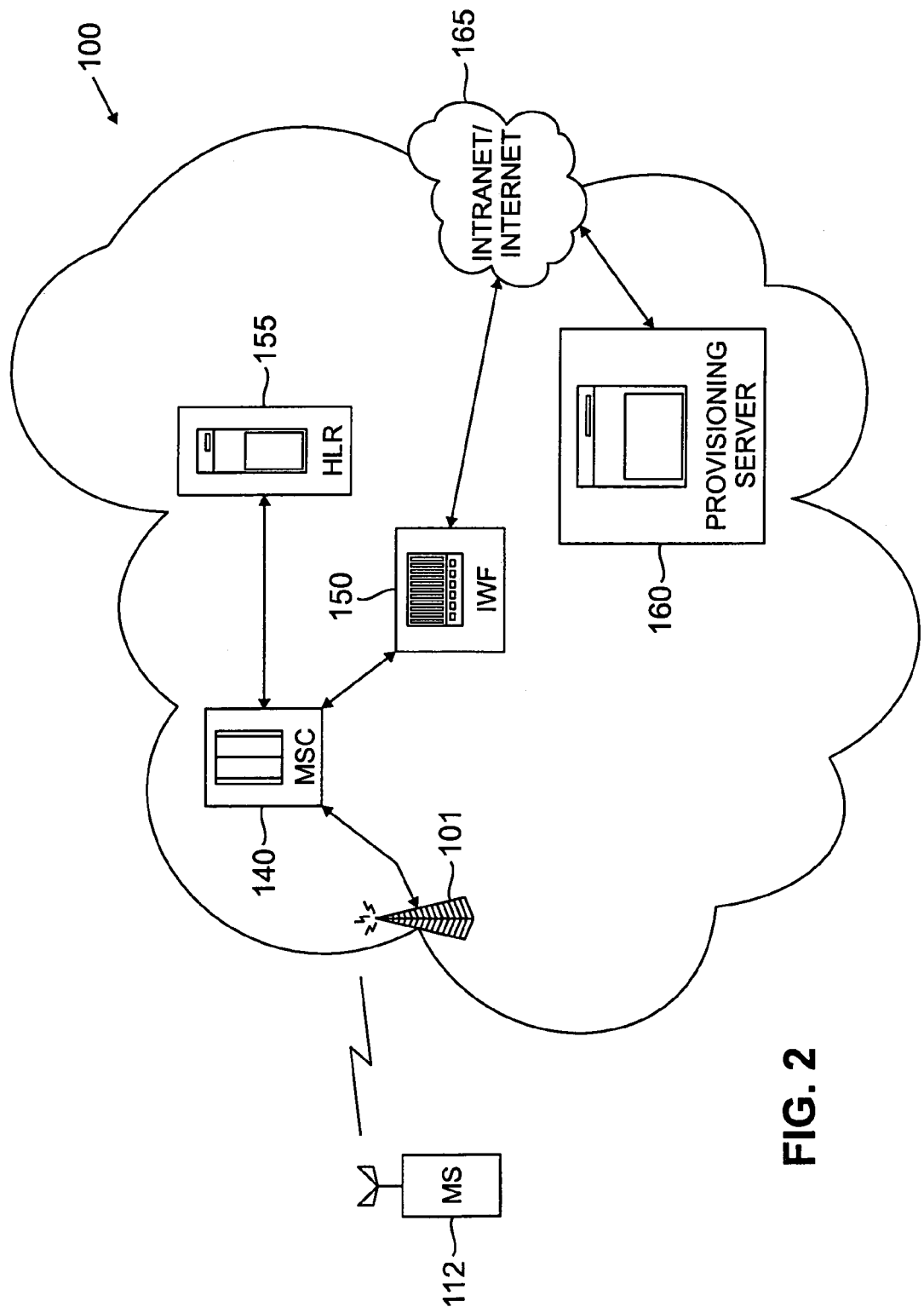
FIG. 2 illustrates an alternate view of selected portions of the exemplary wireless network in FIG. 1 that perform over-the-air (OTA) service provisioning according to one embodiment of the present invention.

FIG. 2 illustrates an alternate view of selected portions of exemplary wireless network 100 that perform over-the-air (OTA) service provisioning according to one embodiment of the present invention. MS 112, BS 101, and MSC 140 are still present, as in FIG. 1. In FIG. 2, wireless network 100 further comprises interworking function (IWF) 150, home location register (HLR) 155, and provisioning server 160.

Provisioning server 160 is a system-wide central server that is located remote from the other components of wireless network 100, namely, BS 101, MSC 140, IWF 150, and HLR 155. In order to access data in provisioning server 160, MSC 140 communicates with provisioning server 160 via intranet/Internet 165 (hereafter "Internet 165"). Since data within wireless network 100 may be communicated in one or more of a wide variety of communication protocols, according to the choices made by the wireless service provider, IWF 150 is needed to translate the "native" communication transport protocol that carries application data in wireless network 100 into Internet protocol (IP) based data packets suitable for transmission in Internet 165.

As will be explained below in greater detail, when an unprovisioned mobile station, such as MS 112, accesses wireless network 100 (via BS 101), then BS 101 and/or MSC 140, using the handset data in HLR 155, identifies MS 112 as an unprovisioned handset and establish a session with provisioning server 160 via Internet 165 in order to perform service provisioning of MS 112. However, because Internet 165 is a network not owned or controlled by the wireless service provider that operates wireless network 100, the present invention provides security protection that prevents an unauthorized person from using MS 112 to access other servers/web sites in Internet 165.

It should be noted that the scope of the present invention is not limited to wireless networks that use the Internet to link base stations and provisioning servers. In alternate embodiments of the present invention, the Internet may actually be a large intranet having a relatively minimal amount of security that links a group of base station to one or more provisioning servers.

Figure 3:
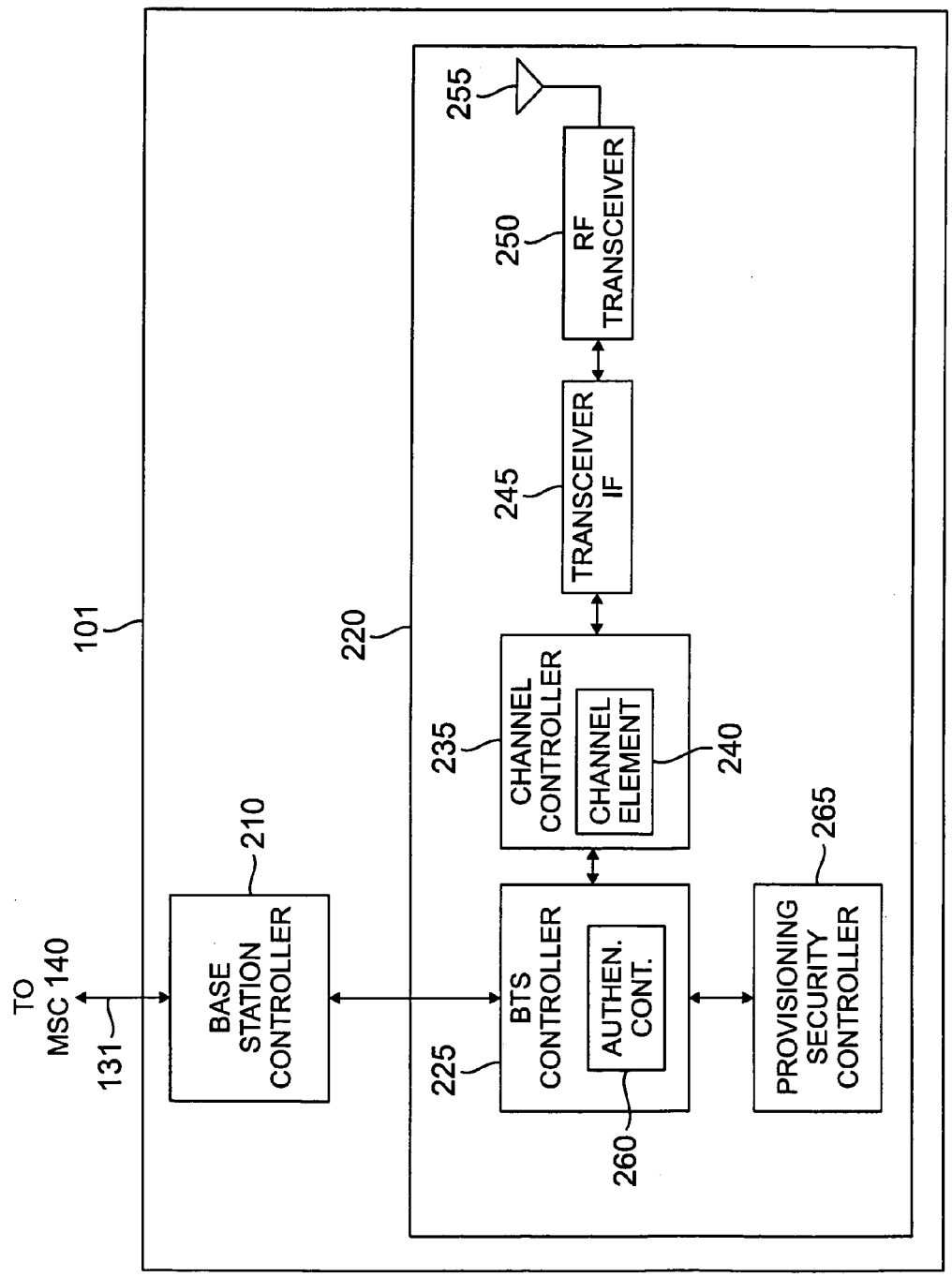
FIG. 3 illustrates in greater detail an exemplary base station in accordance with one embodiment of the present invention.

FIG. 3 illustrates in greater detail exemplary base station 101 in accordance with one embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235 with representative channel element 240, transceiver interface (IF) 245, RF transceiver unit 250, antenna array 255, and provisioning security controller 265, described below in greater detail.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. In an advantageous embodiment of the present invention, the channel elements communicate according to a code division multiple access (CDMA) protocol with the mobile stations in cell site 121. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is a multi-sector antenna, such as a three sector antenna in which each antenna sector is responsible for transmitting and receiving in a 120° arc of coverage area. Additionally, RF transceiver 250 may contain an antenna selection unit to select among different antennas in antenna array 255 during both transmit and receive operations.

In one embodiment of the present invention, BTS controller 225 further comprises authentication controller 260 which verifies whether or not a mobile station, such as MS 112, that is accessing BS 101 has previously been authenticated by wireless network 100 or not. Authentication controller 260, working in conjunction with provisioning security controller 265, also provides the necessary security functions that prevent the use of MS 112 for accessing Internet servers or websites other than provisioning servers associated with wireless network 100. In an alternate embodiment of the present invention, the authentication may be performed in MSC 140 or elsewhere in wireless network 100, and the authentication results may be transmitted to BTS controller 225.

Before any communication can occur between MS 112 and the rest of wireless network 100 through BS 101, authentication controller 260 must first verify (i.e., authenticate) that MS 112 has been service provisioned by determining whether or not MS 112 has, for example, a proper shared secret data (SSD) code and required provisioning data. In one type of conventional service provisioning process, a subscriber typically enters an A-key into a mobile station during the initial provisioning process. However, other methods may be employed for entering or obtaining the A-key. Subsequently, the mobile station may automatically generate a shared secret data (SSD) code from the A-key or by another algorithm. In either case, the mobile station transfers its SSD code as part of the authentication process. Once a mobile station is provisioned, each base station in the network will have an SSD code corresponding to the SSD code for the provisioned mobile station.

Mobile communication systems in North America frequently use the Cellular Authentication Verification and Encryption (CAVE) algorithm for authentication purposes. In an advantageous embodiment of the present invention, BS 101 and interfacing devices utilize a CAVE algorithm for authentication purposes. BS 101 begins the authentication process by transferring an authorization (AUTH) bit in an overhead control message over the control channel for cell site 121. When MS 112 recognizes the AUTH bit, MS 112 automatically transmits identification data, including SSD information, electronic serial number (ESN) data, billing information, dialed subscriber number, and other enabling data to BS 101.

The foregoing description of the authentication process used in wireless network 100 is by way of example only. Those skilled in the art will realize that there are a number of different and well-know authentication processes that may implemented in wireless network 100 in alternate embodiments of the present invention. These alternate authentication processes do not depart from the scope of the present invention.

Authentication controller 260 initially stores incoming data from MS 112 and compares the received SSD information with SSD information retrieved from HLR 155. If authentication controller 260 determines that the received SSD information from MS 112 is valid, then authentication controller 260 examines other data stored in HLR 155, such as NAM data and billing information, to determine if MS 112 has been provisioned. If authentication controller 260 verifies that MS 112 is properly provisioned, the voice/data call is transferred to MSC 140 for normal call processing. If authentication controller 260 determines that MS 112 has not been previously provisioned (i.e., no billing information, no NAM data, etc.), authentication controller 260 transfers all incoming IP packets to provisioning security controller 265 for encryption and transfer to provisioning server 160 through MSC 140 and Internet 165, as described below in greater detail.

In an alternate embodiment of the present invention, authentication controller 260 may determine that a mobile station accessing BS 101 is unprovisioned by other means. For example, if MS 112 cannot even authenticate itself properly, authentication controller 260 may simply reject the call or may automatically transfer all incoming IP packets from MS 112 to provisioning security controller 265 for encryption and transfer to provisioning server 160 through MSC 140 and Internet 165. Alternatively, if MS 112 has dialed a special telephone number, such as "*228xx", reserved for service provisioning, authentication controller 260 may automatically transfer all incoming IP packets from MS 112 to provisioning security controller 265 for encryption and transfer to provisioning server 160.

Figure 4:
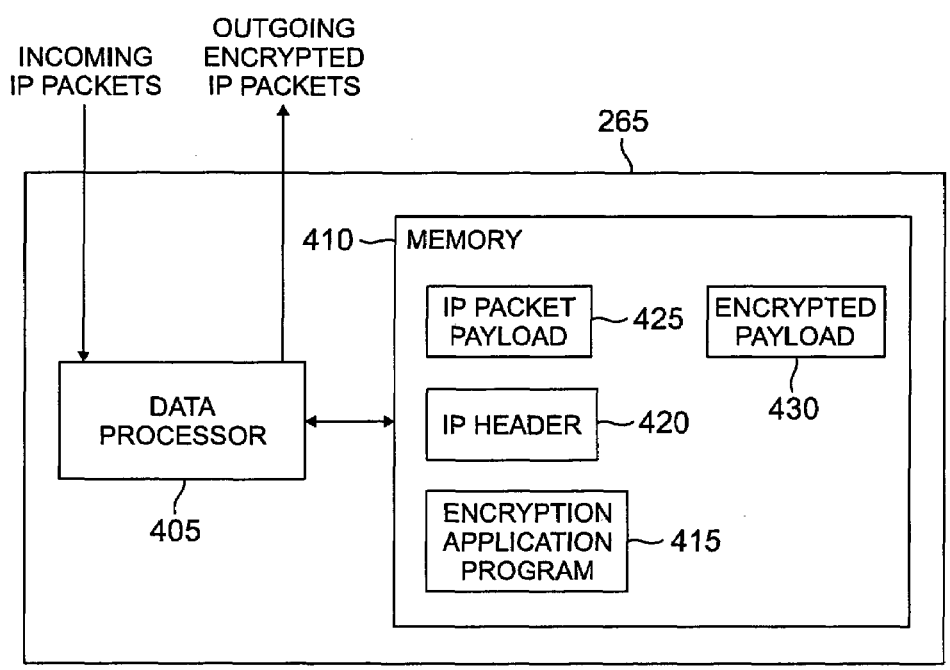
FIG. 4 illustrates in greater detail a provisioning security controller in accordance with one embodiment of the present invention.

FIG. 4 illustrates in greater detail provisioning security controller 265 in accordance with one embodiment of the present invention. Exemplary provisioning security controller 265 comprises data processor 405 and memory 410, which contains storage space for encryption application program 415, IP header field 420, IP packet payload field 425, and encrypted payload field 430. When an unprovisioned mobile station is detected, such as MS 112, data processor 405 receives incoming IP data packets from authentication controller 260 and, under control of encryption application program 415, encrypts the payload information of the received IP data packets. The encrypted IP data packets are then returned to authentication controller 260 as a stream of outgoing encrypted IP data packets.

Memory 410 provides storage for data and programs associated with provisioning security controller 265 and encryption application program 415. Incoming IP data packets consist of an IP header, which contains the destination address of the target device to which the IP data packet is being sent, and an IP payload, which contains the user data and/or commands that are being sent to the target device. As incoming IP data packets are received from authentication controller 260, data processor 405, under control of encryption application program 415, stores the IP header information in IP header field 420 and stores the payloads of the IP data packets in IP packet payload field 425.

Next, data processor 405 encrypts the original data in IP packet payload field 425 according to the encryption algorithm implemented by encryption application program 415 and stores the encrypted data in encrypted payload field 430. Encryption application program 415 may implement any known encryption algorithm. Data processor 405 then reassembles each IP data packet by reattaching the original (and unencrypted) IP header information retrieved from IP header field 420 to the encrypted IP data packet retrieved from encrypted payload field 430. The reassembled IP data packets are then returned to authentication controller 260 as a stream of outgoing encrypted IP data packets.

Authentication controller 260 then transmits the encrypted IP data packets forward to Internet 165 via MSC 140 and IWF 150. Since the IP header information was not encrypted, the encrypted IP data packets are still transferred to the destination IP address designated by MS 112. However, since the entire payload was encrypted, the IP data packets will be useless when it arrives at the destination IP address, unless the device at the destination IP address knows the encryption algorithm. This feature frustrates an unauthorized person or device attempting to use unprovisioned MS 112 to access Internet 165 through wireless network 100. Since provisioning server 160 has the key to the encryption algorithm used by BS 101, provisioning server 160 is able to process legitimate service provisioning requests from unprovisioned MS 112.

Figure 5:
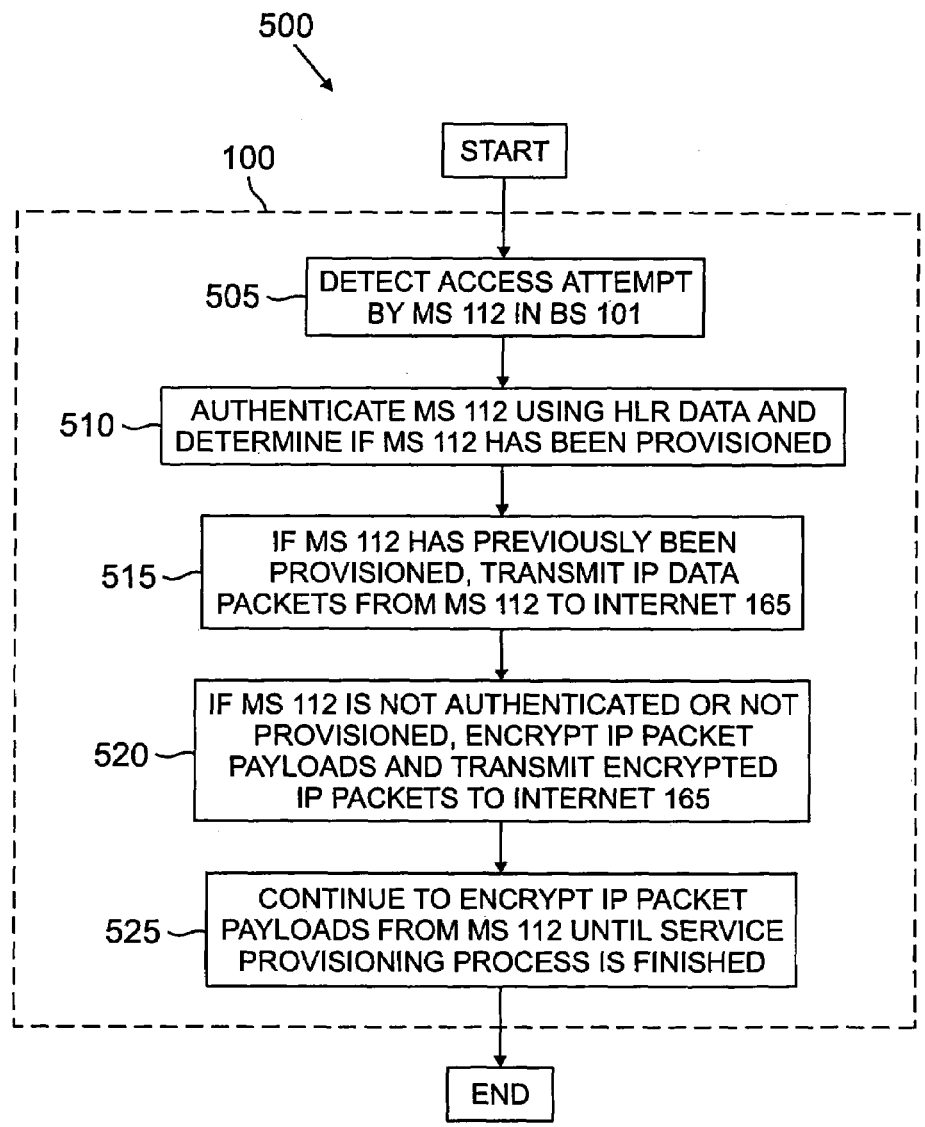
FIG. 5 is a flow chart illustrating an exemplary secure service provisioning operation in the wireless network in FIGS. 1 and 2 in accordance with one embodiment of the present invention.

FIG. 5 depicts flow chart 500, which illustrates an exemplary secure service provisioning operation in wireless network 100 in accordance with one embodiment of the present invention. First, BS 101 detects an access attempt by MS 112 by determining that MS 112 has responded to an AUTH code transmitted by BS 101 (process step 505).

BS 101 receives authentication data from MS 112 and authentication controller 260 uses the received authentication data from MS 112 to access subscriber provisioning data, if any, in HLR 155 to determine if MS 112 is provisioned for wireless network 100 or not (process step 510). BS 101 may determine this provisioning status by one or more methods, including the presence of a dialed unique provisioning number, absence of SSD information, absence of billing information, etc.

If MS 112 is already provisioned, BS 101 transmits the received voice and/or data packets to MSC 140 for normal call processing, including unencrypted Internet-bound payloads (process step 515). If BS 101 is unable to authenticate MS 112 or determines in some other manner that MS 112 has not been provisioned, provisioning security controller 265 encrypts the received IP data packet payloads from MS 112 and causes BS 101 to transmit the encrypted IP data packets to Internet 165 (process step 520). BS 101 continues to encrypt IP packet payloads for transfer between wireless network 100 and Internet 165 until the current call from MS 112 is terminated by the user of MS 112. If the user of MS 112 is a legitimate subscriber attempting to provision MS 112 for the first time, this means that BS 101 continues to encrypt IP data packet payloads for transfer to Internet 165 until the service provisioning process is completed and the subscriber using MS 112 ends the call (process step 525). Once provisioned, MS 112 is ready for normal use.

In alternate embodiments of the present invention, one or both of authentication controller 260 and provisioning security controller 265 may be located outside of base station 101. For example, authentication controller 260 and provisioning security controller 265 may be implemented as a stand alone device coupled directly or indirectly to BS 101. In another embodiment of the present invention, authentication controller 260 and provisioning security controller 265 may be implemented in, for example, MSC 140, IWF 150, or distributed between MSC 140 and IWF 150. In still another embodiment of the present invention, authentication controller 260 and provisioning security controller 265 may be implemented in only some of the base stations in a wireless network. In such an embodiment, two or more base stations may share the same authentication controller 260 and provisioning security controller 265 disposed in just one of the base stations.

Although the present invention has been described in detail, those skilled in the art should understand that they can make various changes, substitutions and alterations herein without departing from the spirit and scope of the invention in its broadest form.

The invention claimed is:

1. For use in a wireless network comprising a plurality of base stations, each of said base stations capable of communicating with a plurality of mobile stations, a security device coupled by a wireline connection to said wireless network capable of preventing an unprovisioned one of said plurality of mobile stations from accessing an Internet protocol (IP) data network through said wireless network, said security device comprising:

a first controller capable of receiving an IP data packet transmitted by said unprovisioned mobile station, said IP data packet comprising an IP packet header and an IP packet payload, determining from said IP data packet that said unprovisioned mobile station is unprovisioned and, in response to said determination, encrypting at least a portion of said IP packet payload to thereby generate an encrypted payload that may be decrypted only by a provisioning server of said wireless network.

2. The security device set forth in claim 1 wherein said first controller is disposed in at least one of said plurality of base stations.

3. The security device set forth in claim 1 wherein said first controller is disposed in at least one of a mobile switching center and an interworking function of said wireless network.

4. The security device set forth in claim 1 further comprising a second controller capable of determining that said unprovisioned mobile station is unprovisioned.

5. The security device set forth in claim 4 wherein said second controller determines that said unprovisioned mobile station is unprovisioned if said unprovisioned mobile station is unable to authenticate to said wireless network.

6. The security device set forth in claim 4 wherein said second controller determines that said unprovisioned mobile station is unprovisioned according to a predetermined telephone number associated with a service provisioning process selected by said unprovisioned mobile station.

7. The security device set forth in claim 4 wherein said second controller determines that said unprovisioned mobile station is unprovisioned according to data retrieved from a home location register associated with said wireless network.

8. The security device set forth in claim 1 wherein said first controller comprises a data processor capable of executing an encryption program stored in a memory associated with said data processor.

9. A wireless network comprising:

a plurality of base stations, each of said base stations capable of communicating with a plurality of mobile stations; and a security device coupled by a wireline connection to said wireless network capable of preventing an unprovisioned one of said plurality of mobile stations from accessing an Internet protocol (IP) data network through said wireless network, said security device comprising:

a first controller capable of receiving an IP data packet transmitted by said unprovisioned mobile station, said IP data packet comprising an IP packet header and an IP packet payload, determining from said IP data packet that said unprovisioned mobile station is unprovisioned and, in response to said determination, encrypting at least a portion of said IP packet payload to thereby generate an encrypted payload that may be decrypted only by a provisioning server of said wireless network.

10. The wireless network set forth in claim 9 wherein said first controller is disposed in at least one of said plurality of base stations.

11. The wireless network set forth in claim 9 wherein said first controller is disposed in at least one of a mobile switching center and an interworking function of said wireless network.

12. The wireless network set forth in claim 9 further comprising a second controller capable of determining that said unprovisioned mobile station is unprovisioned.

13. The wireless network set forth in claim 12 wherein said second controller determines that said unprovisioned mobile station is unprovisioned if said unprovisioned mobile station is unable to authenticate to said wireless network.

14. The wireless network set forth in claim 12 wherein said second controller determines that said unprovisioned mobile station is unprovisioned according to a predetermined telephone number associated with a service provisioning process selected by said unprovisioned mobile station.

15. The wireless network set forth in claim 12 wherein said second controller determines that said unprovisioned mobile station is unprovisioned according to data retrieved from a home location register associated with said wireless network.

16. The wireless network set forth in claim 9 wherein said first controller comprises a data processor capable of executing an encryption program stored in a memory associated with said data processor.

17. For use in a wireless network comprising a plurality of base stations, each of the base stations capable of communicating with a plurality of mobile stations, a method of preventing an unprovisioned one of the plurality of mobile stations from accessing an Internet protocol (IP) data network through the wireless network, the method comprising the steps of:

receiving an IP data packet transmitted by the unprovisioned mobile station in a security device coupled by a wireline connection to the wireless network, the IP data packet comprising an IP packet header and an IP packet payload;

determining that the unprovisioned mobile station is unprovisioned; and encrypting at least a portion of the IP packet payload to thereby generate an encrypted payload that may be decrypted only by a provisioning server of said wireless network.

18. The method set forth in claim 17 wherein the step of determining comprises the step of determining that the unprovisioned mobile station is unable to authenticate to the wireless network.

19. The method set forth in claim 17 wherein the step of determining comprises the step of determining that the unprovisioned mobile station selected a predetermined telephone number associated with a service provisioning process.

20. The method set forth in claim 17 wherein the step of determining that the unprovisioned mobile station is unprovisioned comprises the step of examining data retrieved from a home location register associated with the wireless network.

* * * * *

UNITED STATES PATENT AND TRADEMARK OFFICE
CERTIFICATE OF CORRECTION

PATENT NO. : 7,024,557 B1  Page 1 of 1
APPLICATION NO. : 09/475766
DATED : April 4, 2006
INVENTOR(S) : Bryan J. Moles and Sudhindra P. Herle It is certified that error appears in the above-identified patent and that said Letters Patent is hereby corrected as shown below:

Column 3, line 25, delete "11D".

Signed and Sealed this

Fourteenth Day of November, 2006

JON W. DUDAS
*Director of the United States Patent and Trademark Office*